United States Patent
Lu et al.

(10) Patent No.: US 9,424,600 B2
(45) Date of Patent: Aug. 23, 2016

(54) SYSTEM AND METHOD FOR PROVIDING A PORTABLE AND INTERACTIVE STOREFRONT

(71) Applicant: eBay Inc., San Jose, CA (US)

(72) Inventors: Su-I Lu, Mountain View, CA (US);
Deborah Yee-Ky Liu, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 141 days.

(21) Appl. No.: 14/290,853

(22) Filed: May 29, 2014

(65) Prior Publication Data
US 2014/0279287 A1    Sep. 18, 2014

Related U.S. Application Data

(63) Continuation of application No. 11/962,213, filed on Dec. 21, 2007, now Pat. No. 8,893,029.

(60) Provisional application No. 60/947,200, filed on Jun. 29, 2007.

(51) Int. Cl.
*G06Q 30/06* (2012.01)

(52) U.S. Cl.
CPC ........ *G06Q 30/0631* (2013.01); *G06Q 30/0603* (2013.01); *G06Q 30/0641* (2013.01)

(58) Field of Classification Search
CPC .................................................... G06F 3/048
See application file for complete search history.

(56) References Cited

U.S. PATENT DOCUMENTS

| | | |
|---|---|---|
| 6,405,175 B1 | 6/2002 | Ng |
| 6,732,161 B1 | 5/2004 | Hess et al. |
| 7,529,692 B1 | 5/2009 | Lynch |
| 2002/0091582 A1 | 7/2002 | Palmer |
| 2005/0039122 A1 | 2/2005 | Meadows |
| 2005/0102260 A1 | 5/2005 | Spring et al. |
| 2006/0015435 A1 | 1/2006 | Nathanson |
| 2007/0118434 A1 | 5/2007 | Mengerink et al. |
| 2008/0255934 A1* | 10/2008 | Leventhal .............. G06Q 30/02 705/14.16 |
| 2008/0306853 A1 | 12/2008 | McLemore et al. |
| 2009/0006988 A1 | 1/2009 | Lu et al. |

FOREIGN PATENT DOCUMENTS

WO    WO-2009005635 A1    1/2009

OTHER PUBLICATIONS

"U.S. Appl. No. 11/962,213, Final Office Action mailed Feb. 18, 2011", 13 pgs.
"U.S. Appl. No. 11/962,213, Final Office Action mailed Mar. 15, 2012", 18 pgs.
"U.S. Appl. No. 11/962,213, Final Office Action mailed Nov. 5, 2013", 22 pgs.

(Continued)

*Primary Examiner* — Peiyong Weng
(74) *Attorney, Agent, or Firm* — Schwegman, Lundberg & Woessner, P.A.

(57) ABSTRACT

In an example embodiment, a method for providing a portable and interactive storefront is provided. The method may comprise receiving information associated with a product to be placed in electronic commerce. Content is therefore generated based on the received information, in which the content may provide an interactive storefront. A link to the content is generated and then provided.

17 Claims, 7 Drawing Sheets

(56) References Cited

OTHER PUBLICATIONS

"U.S. Appl. No. 11/962,213, Non Final Office Action mailed May 1, 2013", 22 pgs.
"U.S. Appl. No. 11/962,213, Non Final Office Action mailed Nov. 10, 2011", 15 pgs.
"U.S. Appl. No. 11/962,213, Non-Final Office Action mailed Oct. 21, 2010", 17 pgs.
"U.S. Appl. No. 11/962,213, Notice of Allowance mailed Mar. 17, 2014", 14 pgs.
"U.S. Appl. No. 11/962,213, Response filed Jan. 21, 2011 to Non Final Office Action mailed Oct. 21, 2010", 8 pgs.
"U.S. Appl. No. 11/962,213, Response filed Feb. 10, 2012 to Non Final Office Action mailed Nov. 10, 2011", 9 pgs.
"U.S. Appl. No. 11/962,213, Response filed Mar. 4, 2014 to Final Office Action mailed Nov. 5, 2013", 10 pgs.
"U.S. Appl. No. 11/962,213, Response filed Jun. 12, 2012 to Final Office Action mailed Mar. 15, 2012", 7 pgs.
"U.S. Appl. No. 11/962,213, Response filed Jul. 31, 2013 to Non Final Office Action mailed May 1, 2013", 9 pgs.
"U.S. Appl. No. 11/962,213, Response filed May 8, 2011 to Final Office Action mailed Feb. 18, 2011", 7 pgs.
"U.S. Appl. No. 11/962,213, Supplemental Notice of Allowability mailed Aug. 25, 2014", 8 pgs.
"International Application Serial No. PCT/US2008/007847, International Preliminary Report on Patentability mailed Jan. 14, 2010", 7 pgs.
"International Application Serial No. PCT/US2008/007847, International Search Report and Written Opinion mailed Sep. 3, 2008", 10 pgs.
"Welcome to the BookRouter Homepage", BookRouter.com, [Online]. Retrieved from the Internet:<http://web.archive.org/web/20061018001537/http://bookroutercom/, (Oct. 18, 2006), 1 pg.
U.S. Appl. No. 11/962,213, filed Dec. 21, 2007, System and Method for Providing a Portable and Interactive Storefront.

* cited by examiner

US 9,424,600 B2

SYSTEM AND METHOD FOR PROVIDING A PORTABLE AND INTERACTIVE STOREFRONT

RELATED APPLICATIONS

This application is a continuation of U.S. patent application Ser. No. 11/962,213 filed Dec. 21, 2007 and is related to and hereby claims the priority benefit of U.S. Provisional Patent Application No. 60/947,200 filed Jun. 29, 2007, which applications are incorporated herein by reference in their entirety.

FIELD

The present disclosure relates generally to an electronic commerce system and method. In an example embodiment, the disclosure relates to a system and method for providing a portable and interactive storefront in electronic commerce.

BACKGROUND

Electronic commerce can be the distribution, purchase, or selling of products over the Internet and other computer networks. To place a product in electronic commerce, a user may setup or create a storefront that lists the product. In an example, a storefront may be placed on a Web page. There are a variety of applications that can be used to create and setup a storefront on a Web page. Generally, a user may use such applications to create a storefront. After the storefront is generated, the application generates Hypertext Markup Language (HTML) codes that may be placed within a Web page to describe or create the storefront. However, such HTML codes cannot be easily transferred to other Web pages. Accordingly, if a user wants to copy his storefront to another Web page, the user basically has to completely recreate the storefront. Further, if there are multiple copies of the storefront on various Web pages, a change to one storefront means that the user will also need to laboriously change other storefronts.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

Example embodiments for providing an interactive storefront are provided. A link is used to retrieve content that provides an interactive storefront. To place a product in electronic commerce (e.g., selling a product), a user may provide information associated with the product (e.g., price and images) on a content server. As explained in more detail below, the content server then generates content that provides an interactive storefront. The content server also provides the user a link to the content. To incorporate the interactive storefront into an electronic document (e.g., a Web page), the user embeds or places the link in the electronic document. When the electronic document is opened, the content is retrieved based on the link and a complete interactive storefront is displayed or rendered to the user. The storefront may have a simultaneous listing on one selling web site (e.g., eBay) and other selling web sites. The storefront can be shared among an original store and its subsidiary stores, and the original store can observe those subsidiary stores.

Example Embodiments

Figure 1:
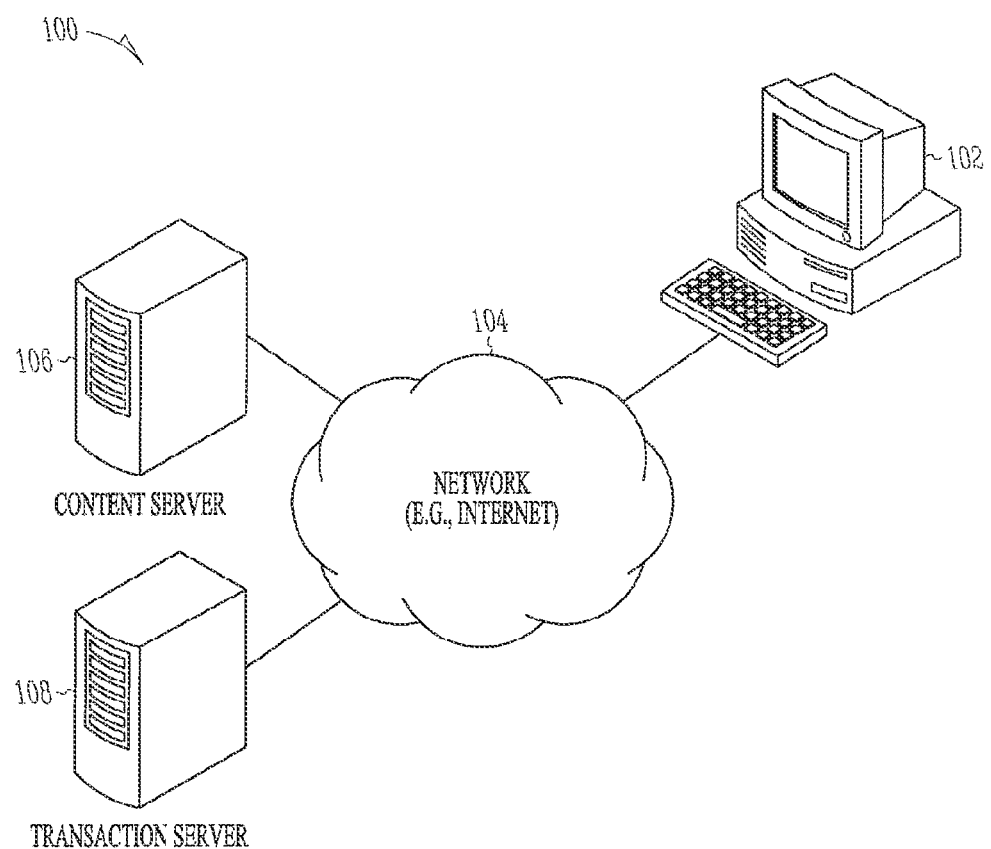
FIG. 1 is a diagram of an example embodiment of a networked system.

FIG. 1 is a diagram of an example embodiment of a networked system. Example system 100 includes various computing devices 106, 108, and 102 in communication by way of network 104, which may include one or more Local Area Networks (LANs) and/or Wide Area Networks (WANs), such as the Internet. As shown in FIG. 1, system 100 includes client computing device 102, content server 106, and transaction server 108. Client computing device 102 can host an application configured to access an electronic document. Examples of such applications include word processors, Web browsers, document viewers, spreadsheets, and other applications. In an example embodiment, the content may be stored on the content server 106. In another example embodiment, the content may be pulled from a URL. In still another example embodiment, the content may be uploaded within a file for population.

Client computing device 102 may access various services and functions supported by content server 106 and transaction server 108. For example, as explained in more detail below, content server 106 may host content provider module that is configured to provide or serve content within a local network. Transaction server 108 may host a transaction application that is configured to implement transactions associated with electronic commerce. Transactions include, for example, tracking a number of products or services ordered, calculating the tax associated with an order, calculating shipping amounts for domestic and international customers, determining options (i.e. different colors and sizes of a product) plus incremental cost (add $1 for XXL blue of a shirt), calculating a cumulative price of an order, verifying payment information including bank account and credit card information, generating invoices, placing an order with a vendor, maintaining store feedbacks from customers, managing store sales, reporting store sales, and other electronic commerce transactions. Transactions may also include managing inventory of a store. For example, a store has 10 shirts of a specific style, and once one of them is sold, transaction server 108 is able to track that there are nine shirts of this style left. Additionally, transactions, in accordance with an example embodiment, may include tracking sales associated with interactive storefronts. In some example embodiments, transactions can include affiliate payouts. For example, a user may copy or use an interactive storefront that is created by another user on his Web page. In an example of an affiliate store payout, the user who has copied the interactive storefront receives a percentage of sales purchased through the interactive storefront. The creator of the interactive storefront makes the sale. It should be appreciated that content server 106 may also host the transaction application, in accordance with another example embodiment. In some example embodiments, an affiliate store payout is automatic through a payment system.

Client computing device 102 and/or content server 106 may access transaction server 108 for use in implementing transactions. It should be noted that while system 100 shown in FIG. 1 employs a client-server architecture, the present disclosure is not limited to such an architecture, and could equally find application in a distributed, or peer-to-peer architecture system.

Figure 2:
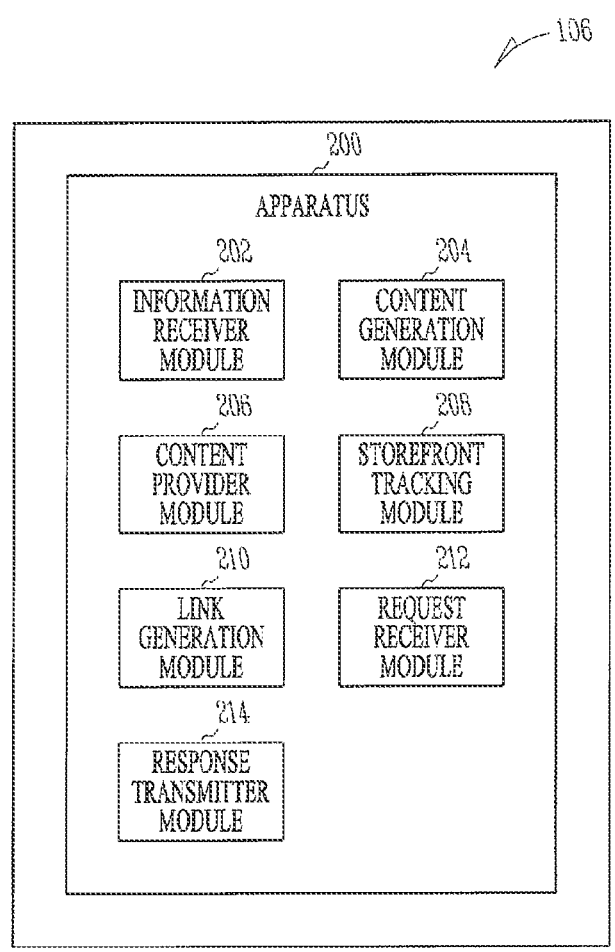
FIG. 2 is a simplified block diagram of an example embodiment of modules that may be included in an apparatus.

FIG. 2 is a simplified block diagram of an example embodiment of modules that may be included in an apparatus. Content server 106 depicted in FIG. 1 may include an example apparatus 200. In various example embodiments, apparatus 200 may be used to implement computer programs, logic, applications, methods, processes, or other software to provide an interactive storefront. As shown in FIG. 2, apparatus 200 may host information receiver module 202, content generation module 204, content provider module 206, storefront tracking module 208, link generation module 210, request receiver module 212, and response transmitter module 214.

In an example embodiment, apparatus 200 may include information receiver module 202 that is configured to receive information associated with a product to be placed in electronic commerce. Apparatus 200 may also include content generation module 204 that is configured to generate content based on the information associated with the product. Apparatus 200 may also include content provider module 206 that is configured to provide or serve the content associated with the product.

In an example embodiment, apparatus 200 may include storefront tracking module 208 that is configured to track and display the distribution of storefronts. As discussed in more detail below, the interactive storefront may be referenced by a link. Storefront tracking module 208 may track all the links, which are used to reference the interactive storefront.

In an example embodiment, apparatus 200 may include link generation module 210 that is configured to generate a link to the content associated with a product. The link can be, for example, a Uniform Resource Identifier (URI) or a Uniform Resource Locator (URL). The link may be provided to a user so that the user may use the link to locate the content associated with the product. In an example embodiment, the link can be embedded in an electronic document or application. An interactive storefront therefore can be ported into a variety of electronic documents and applications with the use of the link.

Furthermore, apparatus 200 may include request receiver module 212 that is configured to receive a request for the content associated with the product. In an example embodiment, the request may be initiated by a link to the content that is included in or embedded within an electronic document. In another example embodiment, the request may be initiated by a link to the content that is included in or embedded within an application.

Apparatus 200, in an example embodiment, may include response transmitter module 214 that is configured to transmit a response to a received request after receiving the request, in which the transmitted response includes content associated with a product. In an example embodiment, the response may include an animation file streamed to a client computing device 102 from a content server 106. In another example embodiment, the response may include an HTML file transmitted to a client computing device 102 from a content server 106.

It should be appreciated that in other example embodiments, apparatus 200 may include fewer, more, or different modules apart from those shown in FIG. 2. For example, in a different example embodiment, content generation module 204 may be integrated with content provider module 206 to form one module.

Figure 3A:
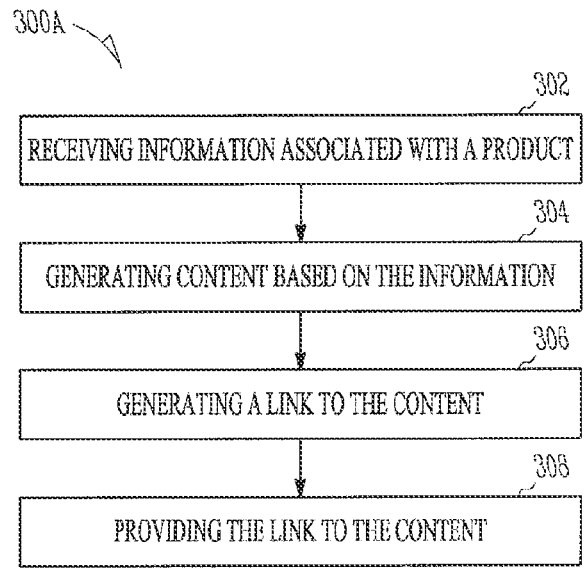
FIG. 3a is a flow diagram of a general overview of a method, in accordance with an example embodiment, for providing a link to content associated with an interactive storefront.

FIG. 3*a* is a flow diagram of a general overview of a method, in accordance with an example embodiment, for providing a link to content associated with an interactive storefront. In an example embodiment, method 300*a* may be implemented by apparatus 200, which is included in such as content server 106 of FIG. 1. A user may want to place a product in electronic commerce. Products are goods or services produced or provided by human, mechanical effort, or a natural process. Examples of products include jewelry, automobiles, e-Books, documents, programming services, repair services, donations, tipping, audio files, video files, images, and other products. Generally, electronic commerce is the distributing, buying, selling, marketing, or servicing of a product over electronic systems, such as the Internet and other computer networks.

As shown in FIG. 3*a*, information associated with a product is received at 302. Information is data associated with a product that is to be placed in electronic commerce. For example, information can include at least one image file, a price, a shipping amount, options plus incremental cost, name of item, a description, a video file, an audio file, an initial bid price, a minimum bid price, and other information. In an example embodiment, a user may provide the information associated with the product to a content server. In another example embodiment, the information may be hosted on another server and the information provided by the user is a pointer (e.g., a link) to the information. In still another example embodiment, the information associated with the product may be pulled from other stores or storefronts. In still another example embodiment, the information associated with the product may be listed in other stores or storefronts. In still another example embodiment, the information associated with the product may be uploaded via a product file.

With the information, content is generated at 304 based on the information. Content is data that is configured to provide an interactive storefront. Content may include, for example, text, codes (e.g., HTML), images, sounds, videos, animations, and other content. In an example, content is data that may be processed to display an interactive storefront. Here, for example, content may be computer codes and/or files that are configured to provide a display of graphical user interface (GUI) associated with an interactive storefront. Such content may include, for example, HTML files, ADOBE FLASH files, JAVA files, and other codes and/or files.

An interactive storefront may be a GUI configured to provide access to the product. In an example, the interactive storefront may include an image of the product and a price of the product. In another example, the interactive storefront may include a listing of multiple products with prices and descriptions associated with each of the products. In still another example, the interactive storefront can include a description associated with a service and a suggested donation. The interactive storefront may be configured to respond to user activities. User activities can include clicking on a graphical region with an input device (e.g., a mouse), selecting a graphical region with an input device, inputting a command with the use of an input device (e.g., keyboard), and other user activities. In an example embodiment, a user may click on a graphical button region within the interactive storefront to purchase a product. In another example embodiment, a user may select a graphical region within the interactive storefront to add a product. In still another example embodiment, a user may select a graphical region to browse through various images of the products. In yet still another example embodiment, a user may move a cursor over a graphical region to trigger a display of a description of a product.

Still referring to FIG. 3a, a link to the content is generated at 306. A link is a string of alphanumeric characters that identify content. For example, a link can include an address that identifies the location of content on the Internet. A Uniform Resource Identifier (URI) and a Uniform Resource Locator (URL) are examples of links.

After the generation of the link to the content associated with the product, the link to the content is provided at 308. The link may be provided to a user, such that the user may use the link to locate the content. An interactive storefront can therefore be generated from the content. As explained in more detail below, a user may therefore incorporate an interactive storefront into an electronic document by using the link.

Figure 3B:
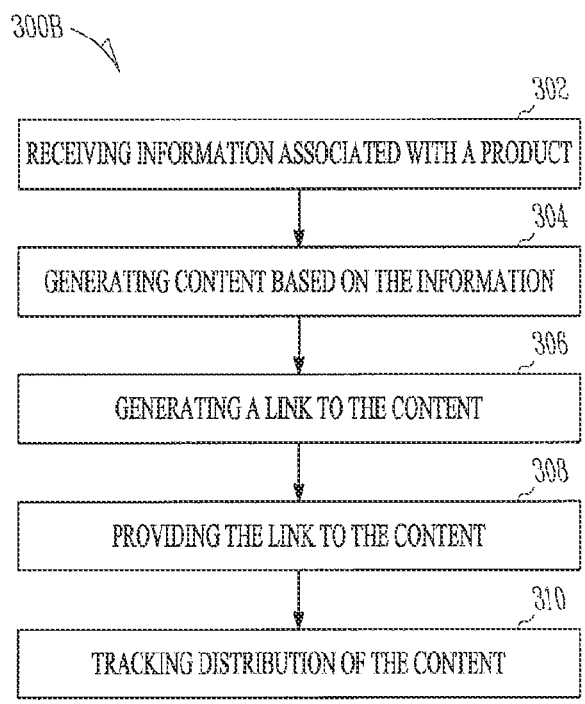
FIG. 3b is a flow diagram of a general overview of a method, in accordance with another example embodiment, for providing a link to content associated with an interactive storefront and for tracking the link.

FIG. 3b is a flow diagram of a general overview of a method, in accordance with another example embodiment, for providing a link to content associated with an interactive storefront and for tracking the link. In an example embodiment, method 300b may be implemented by content generation module 204 of FIG. 2, employed in an apparatus 200 included in such as content server 106 of FIG. 1. Referring to FIG. 3b, at 302, information associated with a product to be placed in electronic commerce is received. At 304, content based on the received information is generated. The generated content may provide an interactive storefront. At 306, a link to the content is generated. At 308, the generated lint is provided to the content. In addition, method 300b of the example embodiment as shown in FIG. 3b further includes tracking distribution of the provided link at 310. For example, storefront tracking module 208 shown in FIG. 2 may track all the links, which are used to reference the interactive storefront.

Figure 4A:
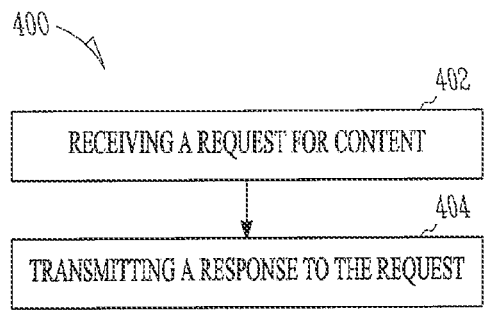
FIG. 4a is a flow diagram of a general overview of a method, in accordance with an example embodiment, for providing an interactive storefront.

FIG. 4a is a flow diagram of a general overview of a method, in accordance with an example embodiment, for providing an interactive storefront. In an example embodiment, method 400 may be implemented by content provider module 206 of FIG. 2, employed in apparatus 200 hosted in, such as content server 106 of FIG. 1.

As discussed above, the link may be used to provide an interactive storefront. The interactive storefront can be accessed with a link and is therefore portable. For example, a user can provide his interactive storefront to another user by simply passing a link to the content associated with the interactive storefront. A user may therefore incorporate an interactive storefront into a variety of applications and electronic documents by using a link. An electronic document includes a document existing in electronic form that is accessible by computer technology. For example, an electronic document can be a file that is not an executable file and includes data for use by a computer program. Examples of an electronic document can include files that are accessible by and/or associated with applications, such as word processing applications, document viewers, email applications, presentation applications, spreadsheet applications, diagramming applications, graphic editors, graphic viewers, enterprise applications, and other applications. Therefore, an electronic document may be composed of alphanumeric texts, symbols, images, videos, sounds, and other data.

It should be noted that an electronic document may have a variety of file formats, and the file formats may be identified by data within the electronic document and/or by the filename extension. Examples of file formats that can be associated with an electronic document can include Adobe Portable Document Format (PDF), Microsoft DOC format, HTML format, Extensible Markup Language (XML) format, Microsoft XLS format, Tag Image File Format (TIFF), and other file formats that can be associated with the electronic document. A user may incorporate an interactive storefront into a variety of electronic documents by embedding the link (e.g., pasting the link) within the electronic documents.

As shown in FIG. 4a, when an electronic document is accessed, a server (e.g., content server 106 of FIG. 1) that stores the content may receive a request for the content at 402. In an example embodiment, the request may be initiated by a link to the content that is included in or embedded within an electronic document. In another example embodiment, the request may be initiated by a link to the content that is included in or embedded within an application. As a result, with the use of a link, an interactive storefront can be ported into a variety of electronic documents and applications.

After the request is received, a response to the request may be transmitted at 404. The response includes the content associated with the product. In an example embodiment, transmission may include content server 106 streaming an animation file to client computing device 102. In another example embodiment, transmission may include content server 106 transmitting an HTML file to client computing device 102.

Figure 4B:
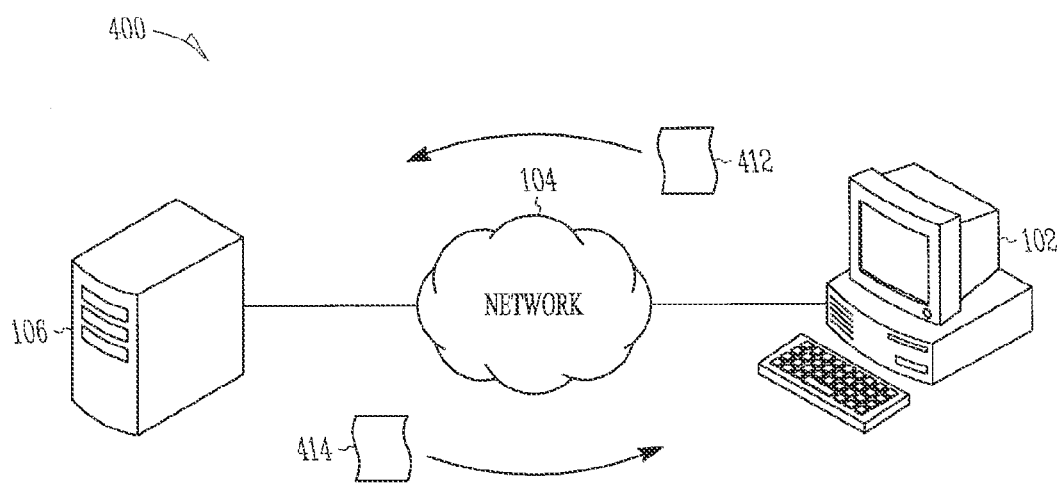
FIG. 4b is a block diagram of an example embodiment that may be used to provide an interactive storefront.

FIG. 4b is a block diagram of an example embodiment that may be used to provide an interactive storefront. In the example embodiment, client computing device 102 is connected with content server 106 via network (e.g., Internet) 104. Client computing device 102 may send request 412 to content server 106 to request for content that is configured to provide an interactive storefront. In an example embodiment, a user, by the use of client computing device 102, may send request 412 to content server 106 by entering a URL of the content in the client computing device. In another example embodiment, a user, by the use of client computing device 102, may send request 412 to content server 106 by clicking the link to the content. The link to the content may be, for example, included in or embedded within an electronic document or application. After receiving request 412 from client computing device 102, content server 106 may transmit response 414 to request 412 via network 104. Response 414 to request 412 includes content that is configured to provide an interactive storefront.

Although a client-server architecture is used in the example embodiment shown in FIG. 4b, it should be appreciated that other architectures, like a distributed architecture or peer-to-peer architecture, can also be used for receiving request 412 and for transmitting response 414.

Figure 5A:
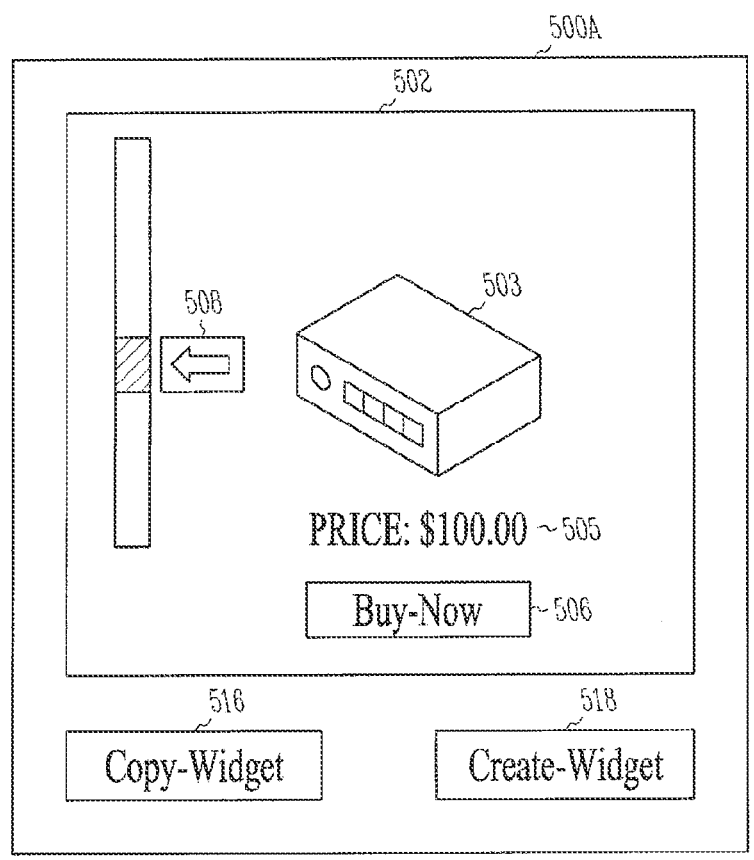
FIG. 5a is a diagram of a graphical user interface (GUI), in accordance with an example embodiment, for providing information associated with contents retrieved from a search.

FIG. 5a is a diagram of a GUI 500a, in accordance with an example embodiment, for providing information associated with contents retrieved from a search. FIG. 5a illustrates an example of GUI 500a that may be displayed in a Web browser. GUI 500a, for example, may be a Web page. In the example embodiment of FIG. 5a, a link to content is embedded within the Web page. As a result, when the Web page is loaded, the link initiates a request for content from a content server, e.g., content server 106 of FIG. 1. In response to the request, content server 106 transmits a response that includes the content associated with the product.

Returning to FIG. 5a, GUI 500a is comprised of region 502. Region 502 is configured to provide rendering of the received content. As discussed above, the content is configured to provide an interactive storefront. In the example embodiment of FIG. 5a, the interactive storefront provides the GUI and interface for a user to complete an electronic commerce transaction. For example, the user can purchase a product by interfacing with region 502. In an example embodiment, a user is not redirected to another Web page to make electronic commerce transactions. As a result, the user can complete the electronic commerce transaction by using, for example, a single Web page.

In the example embodiment shown in FIG. 5a, the interactive storefront includes an image of the product being sold and the price associated with the product. Region 502 includes image 503 of a product, slideshow button 508, "buy-now" button 506, "copy-widget" button 516, "create-widget" button 518, and price 505 associated with the product. Region 502 of FIG. 5a displays only one image of a product, but it should be appreciated that region 502 can be configured to display a series of images associated with one or more products. An example of such a display is a slideshow of various images. A user may select or click on slideshow button 508 to cycle through images 503. In an example embodiment, the storefront provides customers with more options on the listed products. For example, customers may be authorized to choose products with different sizes, and there are slideshows available to help customers choose among the products with different sizes. If the user wants to buy the product shown by image 503, the user can click on "buy-now" button 506 to make the purchase immediately. In response, region 502 may, for example, display a different interactive storefront that shows a confirmation of the product purchased.

Furthermore, a user may select or click on "copy-widget" button 516 to copy the interactive storefront. In response, a link to the interactive storefront may be provided. The user can therefore paste the link to, for example, an electronic document or application. In addition, to create an interactive storefront, a user may select or click on "create-widget" button 518, which may redirect the user to, for example, a Web page provided by a content server for to create interactive storefronts. The storefront can be edited at an time.

Figure 5B:
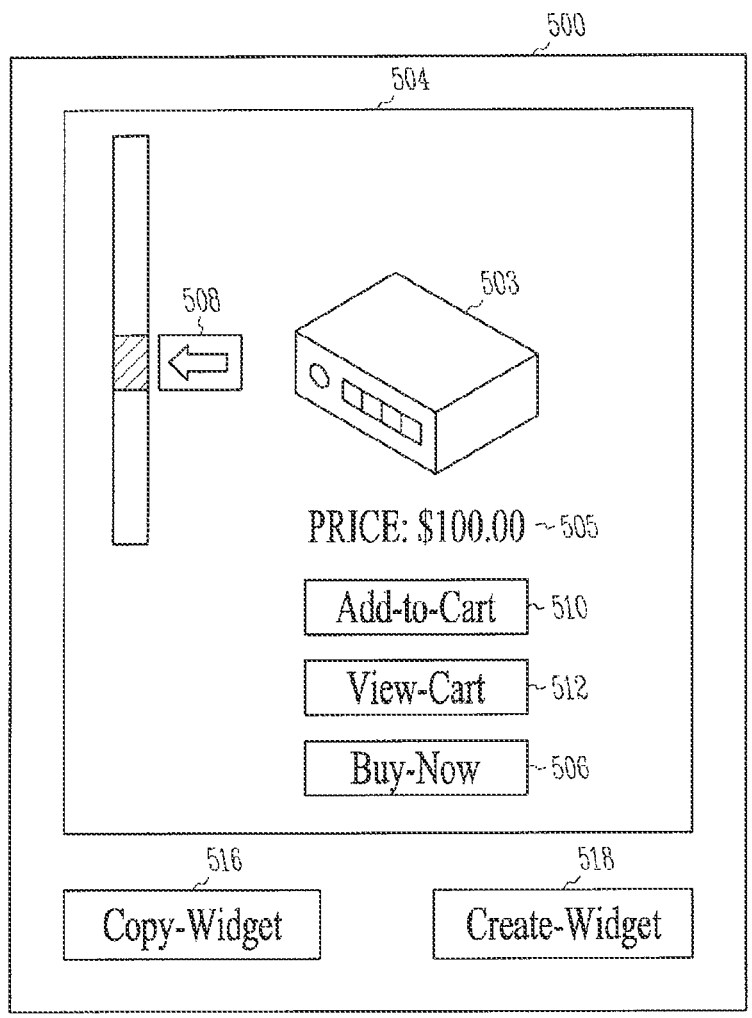
FIG. 5b is a diagram of a graphical user interface (GUI), in accordance with another example embodiment, for providing information associated with contents retrieved from a search.

FIG. 5b is a diagram of a GUI 500b, in accordance with another example embodiment, for providing information associated with contents retrieved from a search. As shown in FIG. 5b, in region 504 of GUI 500b, in addition to image 503 of the product, slideshow button 508, price 505 of the product, "buy-now" button 506, "copy-widget" button, and "create-widget" button, region 504 also includes "add-to-cart" button 510 and "view-cart" button 512. To place or add a product to a shopping cart of products, a user may click on "add-to-cart" button 510. To view the products included in a shopping cart, a user may click on "view-cart" button 512.

It should be appreciated that GUIs 500a or 500b may display further information, e.g., notification of the store closed for vacation, customers' feedback for purchases, international and domestic shipping. In some example embodiments, GUIs 500a or 500b may also display sales and order information on the storefront only for the store owners.

It should be appreciated that any number of suitable layouts can be designated for region and button layouts illustrated above in FIGS. 5a and 5b does not represent all possible layout options available. The displayable appearance of the regions and buttons can be defined by a variety of geometric shapes (e.g., rectangle, square, circle, triangle, etc.), alphanumeric characters (e.g., A, v, t, Q, 1, 9, 10, etc.), symbols (e.g., $, *, @, ∞, etc.), shading, pattern (e.g. solid, hatch, stripes, dots, etc.), and color. Furthermore, for example, "buy now" button 506, or other regions, may be omitted or dynamically assigned. It should also be appreciated that the regions can be fixed or customizable. In addition, the computing devices may have a fixed set of layouts, utilize a defined protocol or language to define a layout, or an external structure can be reported to the computing device that defines the layout. Finally, clicking or selecting on a region or button of GUI as discussed above may trigger code to cause the functionality described herein.

Figure 6:
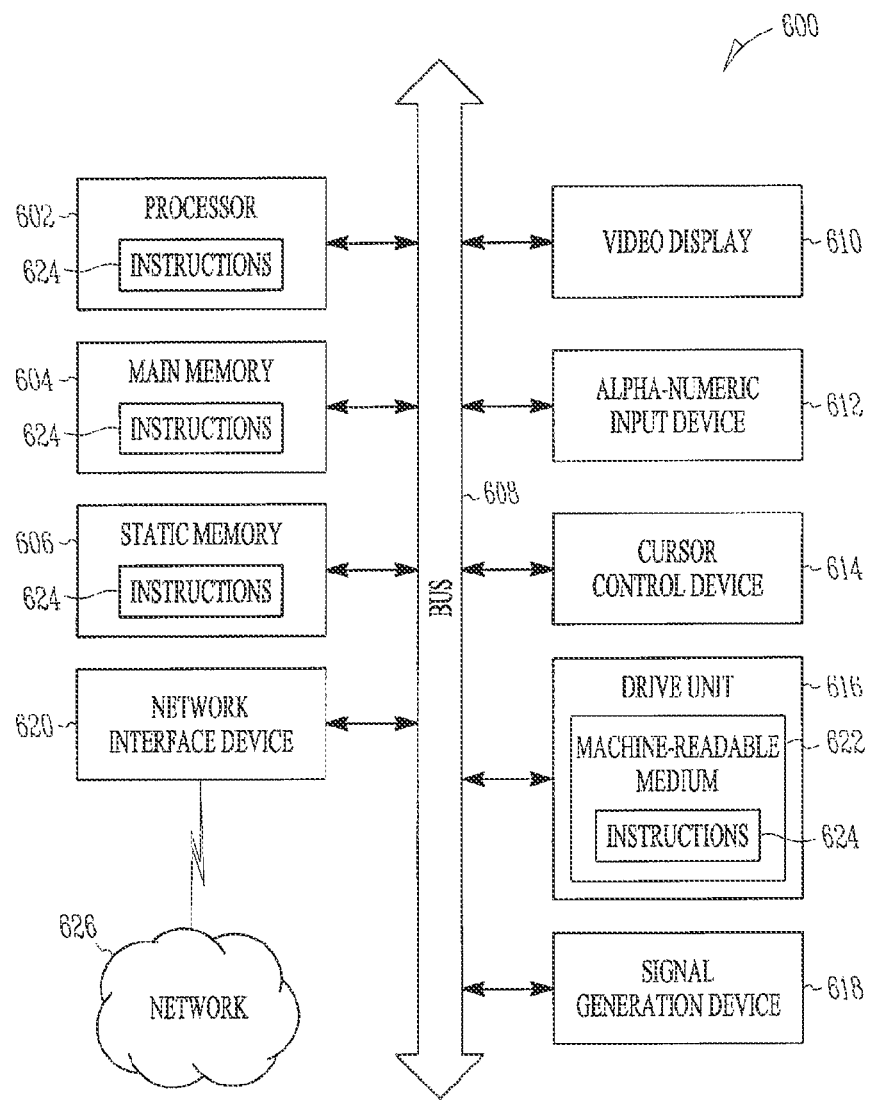
FIG. 6 shows a diagrammatic representation of an example embodiment of a machine in the example form of computer system within which a set of instructions, for causing the machine to perform any one or more of the methodologies discussed herein, may be executed.

FIG. 6 shows a diagrammatic representation of an example embodiment of a machine in the example form of a computer system within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes processor 602 (e.g., a central processing unit (CPU), a graphics processing unit (GPU) or both), main memory 604 and static memory 606, which communicate with each other via bus 608. Computer system 600 may further include video display unit 610 (e.g., a plasma display, a liquid crystal display (LCD) or a cathode ray tube (CRT)). Computer system 600 also includes alphanumeric input device 612 (e.g., a keyboard), user interface (UI) navigation device 614 (e.g., a mouse), disk drive unit 616, signal generation device 618 (e.g., a speaker) and network interface device 620.

Disk drive unit 616 includes machine-readable medium 622 on which is stored one or more sets of instructions and data structures (e.g., software 624) embodying or utilized by any one or more of the methodologies or functions described herein. Software 624 may also reside, completely or at least partially, within main memory 604 and/or within processor 602 during execution thereof by computer system 600, main memory 604, and processor 602 also constituting machine-readable media.

Software 624 may further be transmitted or received over network 626 via network interface device 620 utilizing any one of a number of well-known transfer protocols (e.g., HTTP).

While machine-readable medium 622 is shown in an example embodiment to be a single medium, the term "machine-readable medium" should be taken to include single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although an example embodiment has been described with reference to specific example embodiments, it will be evident that various modifications and changes may be made to these example embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
    providing an interactive storefront, the interactive storefront including content associated with a product, a first user interface element and a second user interface element;
    generating a link to the interactive storefront;
    responsive to a first interaction with the first user interface element, copying the link to the interactive storefront to create a copy of the interactive storefront;
    providing simultaneous listing of the product on at least two interactive storefronts, the at least two interactive storefronts including the interactive storefront and the copy of the interactive storefront;
    tracking distribution of links for the at least two interactive storefronts; and
    responsive to a second interaction with the second user interface element, providing an interface for creating a new interactive storefront different from the interactive storefront.

2. The method of claim 1, wherein the link to the interactive storefront comprises a Uniform Resource Locator (URL).

3. The method of claim 1, wherein the interactive storefront is incorporated into an electronic document.

4. The method of claim 1, wherein the first and second interactions with the first and second user interface elements comprise clicks on the user interface element.

5. The method of claim 1, further comprising:
    pasting the link to the interactive storefront into a data structure to generate the copy of the interactive storefront.

6. The method of claim 5, wherein the data structure comprises a website.

7. The method of claim 5, further comprising:
    responsive to a reception of a purchase request via the copy of the interactive storefront, processing by the server an affiliate store payout.

8. The method of claim 7, wherein a percentage of sales purchased through the copy of the interactive storefront is paid to a user who created the copy of the interactive storefront.

9. The method of claim 1, further comprising:
    in response to the second interaction with the second user interface element from a user, redirecting the user to a website provided by the server to create the new interactive storefront.

10. An electronic commerce system, comprising:
    a server;
    a content generation module to provide content associated with a product to provide an interactive storefront;
    a link generation module, using the server, to generate a link to the interactive storefront;
    wherein the interactive storefront includes a first user interface element for copying the link to the interactive storefront to create a copy of the interactive storefront;
    a listing module to provide simultaneous listing of the product on the interactive storefront and the copy of the interactive storefront;
    wherein a percentage of sales purchased through the copy of the interactive storefront is paid to a user who created the copy of the interactive storefront; and
    wherein the interactive storefront includes a second user interface element for creating a new interactive storefront different from the interactive storefront.

11. The system of claim 10, wherein distribution of links to the interactive storefront and the copy of the interactive storefront are tracked.

12. A non-transitory machine-readable medium comprising instructions, which when implemented by one or more processors, perform the following operations:
    providing an interactive storefront, the interactive storefront including content associated with a product, a first user interface element and a second user interface element;
    generating a link to the interactive storefront;
    responsive to a first interaction with the first user interface element, copying the link to the interactive storefront to create a copy of the interactive storefront;
    providing simultaneous listing of the product on at least two interactive storefronts, the at least two interactive storefronts including the interactive storefront and the copy of the interactive storefront;
    tracking distribution of links for the at least two interactive storefronts; and
    responsive to a second interaction with the second user interface element, providing an interface for creating a new interactive storefront different from the interactive storefront.

13. The non-transitory machine-readable medium of claim 12, wherein the interactive storefront is incorporated into an electronic document.

14. The non-transitory machine-readable medium of claim 12, the operations further comprising:

pasting the link to the interactive storefront into a data structure to generate the copy of the interactive storefront.

15. The non-transitory machine-readable medium of claim 14, the operations further comprising:
responsive to a reception of a purchase request via the copy of the interactive storefront, processing by the server an affiliate store payout.

16. The non-transitory machine-readable medium of claim 15, wherein a percentage of sales purchased through the copy of the interactive storefront is paid to a user who initiating to create the copy of the interactive storefront.

17. The non-transitory machine-readable medium of claim 12, responsive to the second interaction with the second user interface element from a user, redirecting the user to a website provided by the server to create the new interactive storefront.

* * * * *